(12) United States Patent
Heide (10) Patent No.: US 10,200,849 B1
(45) Date of Patent: Feb. 5, 2019

(54) SYSTEMS AND METHODS FOR AUTO-PAIR VIA A PLURALITY OF PROTOCOLS

(71) Applicant: Toyota Motor Engineering & Manufacturing North America, Inc., Erlanger, KY (US)

(72) Inventor: Luke D. Heide, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/880,899

(22) Filed: Jan. 26, 2018

(51) Int. Cl.
| | |
|---|---|
| *H04W 8/00* | (2009.01) |
| *H04W 48/16* | (2009.01) |
| *H04W 4/80* | (2018.01) |
| *H04W 4/48* | (2018.01) |
| *H04W 76/14* | (2018.01) |
| *H04L 29/06* | (2006.01) |
| *H04W 12/04* | (2009.01) |
| *H04W 12/06* | (2009.01) |

(52) U.S. Cl.
CPC ............ *H04W 8/005* (2013.01); *H04W 4/48* (2018.02); *H04W 4/80* (2018.02); *H04W 48/16* (2013.01); *H04W 76/14* (2018.02); *H04L 63/06* (2013.01); *H04L 63/083* (2013.01); *H04W 12/04* (2013.01); *H04W 12/06* (2013.01)

(58) Field of Classification Search
CPC ....... H04W 8/005; H04W 76/14; H04W 4/48; H04W 4/80; H04W 48/16; H04W 12/06; H04W 12/04
USPC ........................................................ 455/41.2
See application file for complete search history.

(56) References Cited

U.S. PATENT DOCUMENTS

| | | | | |
|---|---|---|---|---|
| 2008/0057868 | A1* | 3/2008 | Chang .................. | H04M 1/6058 455/41.2 |
| 2013/0017816 | A1* | 1/2013 | Talty ..................... | H04W 76/14 455/418 |
| 2016/0366858 | A1* | 12/2016 | Seltzer ................. | A01K 27/009 |
| 2017/0337900 | A1* | 11/2017 | Dai ........................ | H04W 76/10 |

* cited by examiner

*Primary Examiner* — Ayodeji O Ayotunde
(74) *Attorney, Agent, or Firm* — Dinsmore & Shohl LLP (57) ABSTRACT

Systems and methods for auto-pairing using a plurality of protocols are described. One embodiment of a system includes an environment computing device that includes a Bluetooth low energy (BLE) hardware component for facilitating communication via a BLE protocol. The environment computing device may also include a Bluetooth classic hardware component for facilitating communication via a Bluetooth classic protocol and a memory component that stores logic. When the logic is executed by the environment computing device, the environment computing device may establish, via the BLE hardware component, a BLE connection with a user device, may receive a message via the BLE connection to turn on a Bluetooth classic discover mode, and may establish a Bluetooth classic connection with the user device.

20 Claims, 7 Drawing Sheets

SYSTEMS AND METHODS FOR AUTO-PAIR VIA A PLURALITY OF PROTOCOLS

TECHNICAL FIELD

Embodiments described herein generally relate to systems and methods for auto-pairing via a plurality of protocols and, more specifically, to embodiments for pairing a mobile phone with a vehicle computing device.

BACKGROUND

Many current vehicles are configured to pair with a user device using a wireless protocol, such as Bluetooth. By pairing the vehicle computing device and user device, the vehicle may be able to provide access to contacts, content, applications, etc. the user via a vehicle user interface. While pairing the user device with the vehicle computing device provides desirable features, initiating the pairing process may be difficult and frustrating for vehicle and user device users. As such, a need exists in the art.

SUMMARY

Systems and methods for auto-pairing using a plurality of protocols are described. One embodiment of a system includes an environment computing device that includes a Bluetooth low energy (BLE) hardware component for facilitating communication via a BLE protocol. The environment computing device may also include a Bluetooth classic hardware component for facilitating communication via a Bluetooth classic protocol and a memory component that stores logic. When the logic is executed by the environment computing device, the environment computing device may establish, via the BLE hardware component, a BLE connection with a user device, may receive a message via the BLE connection to turn on a Bluetooth classic discover mode, and may establish a Bluetooth classic connection with the user device.

In another embodiment, a system includes a user device that includes a first communication hardware component for communicating via a first communication protocol. The user device may also include a second communication hardware component for communicating via a second communication protocol. The user device may further include a first processor, and a first memory component that stores user-side logic. Embodiments of the system may include an environment computing device that includes a third communication hardware component for communicating via the first communication protocol, a fourth communication hardware component for communicating via the second communication protocol, a second processor, and a second memory component that stores environment-side logic. In some embodiments, the environment-side logic causes the environment computing device to send an identifier associated with the third communication hardware component to the user device and establish a connection with the user device via the first communication protocol. In some embodiments, the user-side logic causes the user device to communicate a message to the environment computing device via the first communication protocol to turn on a discover mode on the fourth communication hardware component. In some embodiments, the environment-side logic causes the environment computing device to turn on a discover mode for the second communication protocol and pairs with the user device via the second communication protocol.

In yet another embodiment, a vehicle includes a vehicle computing device that includes a Bluetooth low energy (BLE) hardware component for facilitating communication via a BLE protocol. The vehicle computing device may additionally include a Bluetooth classic hardware component for facilitating communication via a Bluetooth classic protocol. In some embodiments the vehicle computing device includes a memory component that stores logic that, when executed by the vehicle computing device, causes the vehicle computing device to establish, via the BLE hardware component, a BLE connection with a user device, receive a message via the BLE connection to turn on a Bluetooth classic discover mode, and turn on the Bluetooth classic discover mode via the Bluetooth classic hardware component. In some embodiments, the logic causes the vehicle computing device to establish a Bluetooth classic connection with the user device.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for auto-pairing via a plurality of protocols. Some embodiments are configured to utilize a first communication protocol (such as Bluetooth low energy (BLE)) to automatically pair a first device and a second device (such as a vehicle computing device and a user device) via a second communication protocol (such as Bluetooth classic). The systems and methods for auto-pairing via a plurality of protocols incorporating the same will be described in more detail, below.

Figure 1:
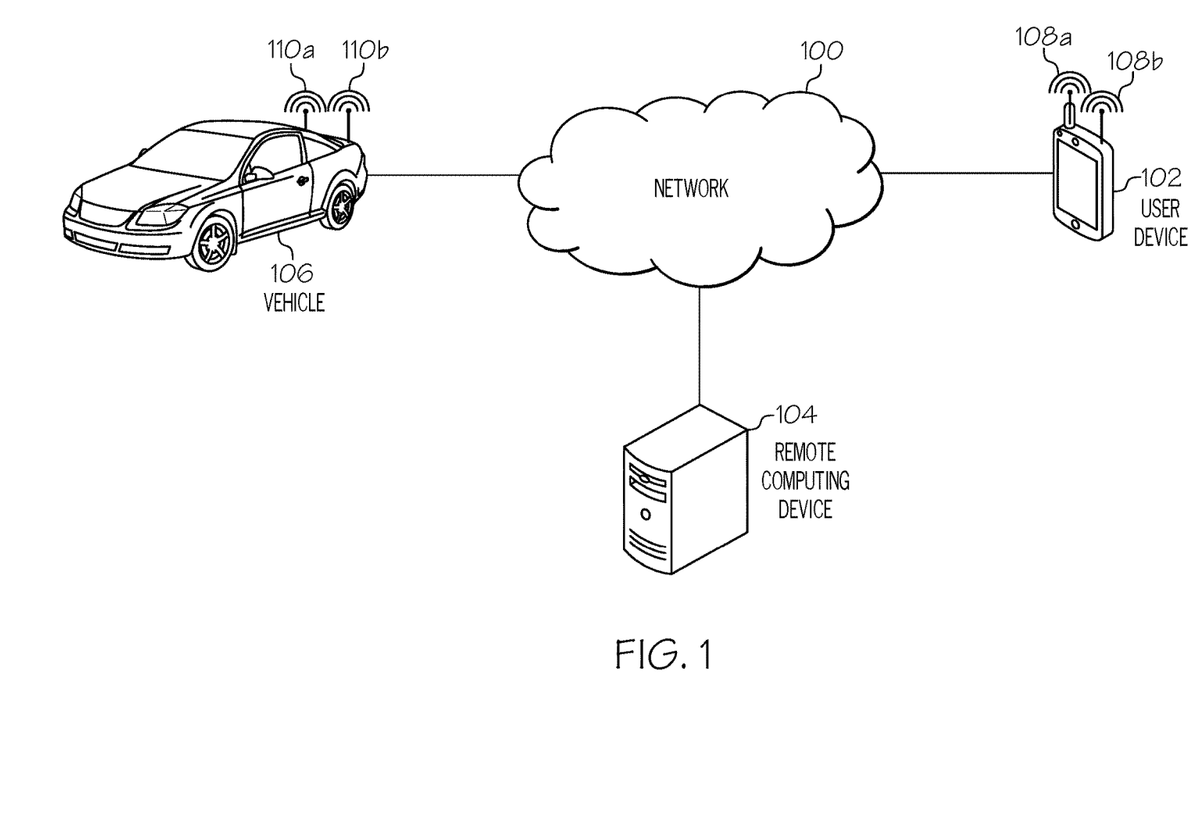
FIG. 1 depicts a computing environment for auto-pairing via a plurality of protocols, according to embodiments described herein.

Referring now to the drawings, FIG. 1 depicts a computing environment for auto-pairing via a plurality of protocols, according to embodiments described herein. As illustrated, the environment of FIG. 1 includes a network 100 that couples a user device 102, a remote computing device 104 and a vehicle 106. The network 100 may include any wide area network (such as the internet, mobile data network, telephone network, etc.), any local network (such as a wireless fidelity (Wi-Fi) network, local area network, etc.), and/or any near field network (via protocols such as Bluetooth classic, BLE, ZigBee, near field communication, etc.).

The user device 102 may include any computing device that is utilized by a user, such as a vehicle driver, vehicle owner, homeowner, office tenant, and/or other entity that also utilizes the vehicle 106 or other related environment. As such, while the user device 102 is depicted as a mobile phone, it will be understood that the user device 102 may include any computing device, such as a personal computer, laptop, tablet, mobile phone, and/or other user device for providing the functionality described herein. The user device 102 may include antennas 108a, 108b for facilitating communication with the vehicle 106 via a plurality of respective protocols. As an example, the antenna 108a may be utilized to communicate via a BLE protocol, while the antenna 108b may be utilized to communicate via a Bluetooth classic protocol. It should also be understood that while the antennas 108a, 108b (as well as antennas 110a, 110b on the vehicle 106) are depicted as external antennas, this is merely an example. Depending on the embodiment, the antennas 108, 110 may be internal or nonexistent. Some embodiments may utilize a wired connection for one or more of the protocols. Additionally, the user device 102 may include a first memory component, a first processor, and/or other computing components, such as those described with reference to FIG. 7.

The vehicle 106 may be configured as any environment with which a user may pair a user device 102. As such, some embodiments may include a land-based vehicle, a water-based vehicle, an air-based vehicle, a home, an office, a public area, and/or other environment. While examples described herein refer to vehicle 106, it will be understood that such examples extend to other environments, as applicable.

As discussed above, the vehicle 106 may include antennas 110a, 110b, which are configured for facilitating communication with the user device 102 via a plurality of different protocols. As such, the vehicle 106 may include a second memory component, a second processor and/or other computing infrastructure such as described with reference to FIG. 7.

The remote computing device 104 may be configured as any computing device for performing the functionality described herein. Accordingly, the remote computing device 104 may include a personal computer, laptop, tablet, mobile phone, server, etc. Additionally, the remote computing device 104 may be configured to facilitate communication with the user device 102 and/or the vehicle 106. While communication with the remote computing device 104 may utilize the first protocol and/or the second protocol, some embodiments utilize a third communication protocol for this communication. As such, the remote computing device 104 may include a third memory component, a third processor and/or other computing infrastructure such as described with reference to FIG. 7.

As an example, some embodiments may utilize a BLE protocol for the first communication protocol, Bluetooth classic for the second communication protocol, and a mobile data protocol (such as long term evolution (LTE), 4G, 5G, etc.) for the third communication protocol. Similarly, some embodiments may utilize a plurality of protocols for facilitating communication between the remote computing device 104 and the user device 102 and between the remote computing device 104 and the vehicle 106 (e.g., Wi-Fi with an internet service provider internet connection).

Figure 2:
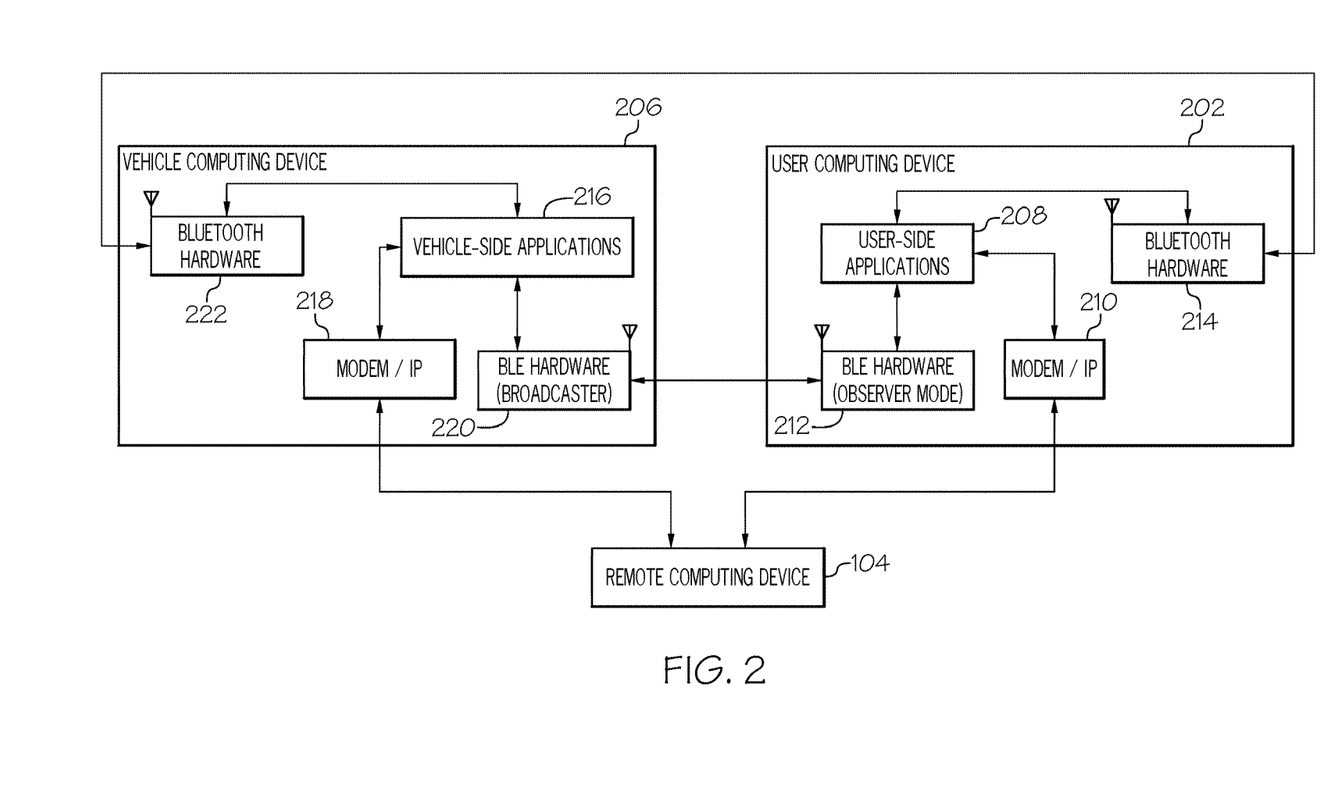
FIG. 2 depicts computing components that may be utilized for pairing a user device with a vehicle computing device, according to embodiments described herein.

FIG. 2 depicts computing components that may be utilized for pairing a user computing device 202 with an environment computing device, such as a vehicle computing device 206, according to embodiments described herein. As illustrated, the user computing device 202 may include user-side logic, such as one or more user-side applications 208. As discussed in more detail below, the user-side applications 208 may include user-side BLE logic, user side Bluetooth logic, user-side pairing logic, and/or other logic. Also included are a modem 210, a first communication hardware component (such as a user-side BLE hardware component 212), which may include antenna 108a, and a second communication hardware component (such as a user-side Bluetooth classic hardware component 214), which may include antenna 108b. The modem 210 may be configured to utilize one or more pieces of logic in the user-side applications 208 to facilitate communication between the user device 102 and other computing devices via an internet service provider. The user-side BLE logic may interface with the user-side BLE hardware component 212 to facilitate communication between the user device 102 and other computing devices via a BLE protocol. The user-side Bluetooth logic may interface with the user-side Bluetooth classic hardware component 214 to facilitate communication between the user device 102 and other computing devices via a Bluetooth classic protocol.

Similarly, the vehicle computing device 206 may include environment side logic, such as one or more vehicle-side applications 216, a modem 218, a third communication hardware component (such as an environment-side BLE hardware component 220), and fourth communication hardware component (such as an environment-side Bluetooth classic hardware component 222). The vehicle-side applications 216 (also referred to as environment-side applications) may include programs and other logic for facilitating the registration processes described herein. The modem 218 may utilize one or more pieces of logic for communicating with other computing devices via an internet service provider. The environment-side BLE hardware component 220 (which may include antenna 110a) may utilize one or more pieces of logic from the vehicle-side applications 216 (such as the BLE logic 744a) to facilitate communication via a BLE protocol. The environment-side Bluetooth classic hardware component 220 (which may include antenna 110b) may utilize one or more pieces of logic from the vehicle-side applications 216 (such as the Bluetooth logic 744b) to facilitate communication via a Bluetooth classic protocol.

Accordingly, the modem 210 and the modem 218 may be configured to communicate with the remote computing device 104 and/or other devices. The user-side BLE hardware component 212 may facilitate communication with the environment-side BLE hardware component 220, where the user-side BLE hardware component 212 may operate in an observer mode and the environment-side BLE hardware component 220 operates in a broadcaster mode. Depending on the embodiment, these modes may be swapped. The user-side Bluetooth classic hardware component 214 may facilitate communication with the environment-side Bluetooth classic hardware component 222.

Figure 3:
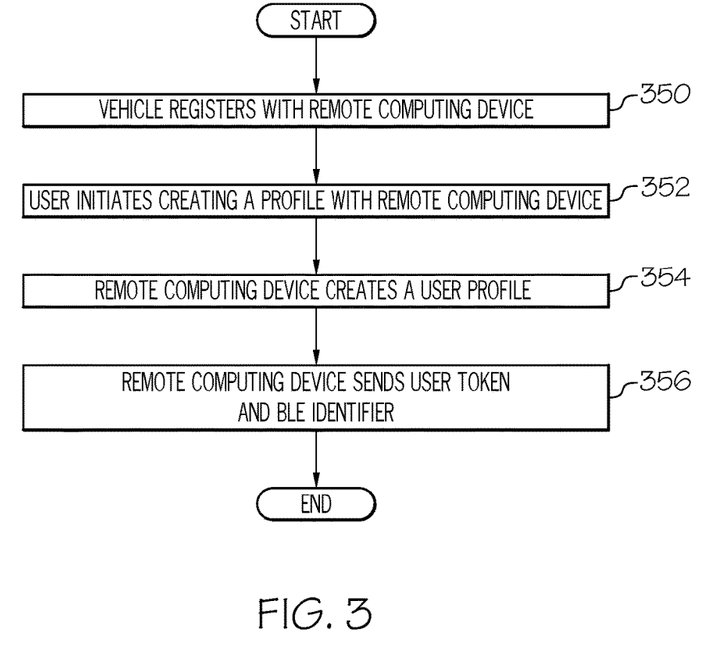
FIG. 3 depicts a flowchart for initiating registering a user device and a vehicle computing device for pairing, according to embodiments described herein.

FIG. 3 depicts a flowchart for initiating registering a user device 102 and a vehicle computing device 206 for pairing, according to embodiments described herein. As illustrated in block 350, the vehicle 106 registers with the remote computing device 104. This registration may be performed prior to a user acquisition of the vehicle 106, such as during manufacturing, assembly, etc. The vehicle registration may be performed via the vehicle computing device 206 and/or other computing device and may include a submission of a vehicle identifier (such as a VIN) and a BLE identifier (such as a MAC address of the BLE hardware component 220 to the remote computing device 104 or other identifier). After receiving this information, the remote computing device 104 may link the vehicle identifier and the BLE identifier as being associated with the vehicle 106.

In block 352, a user of the user device 102 initiates creating a profile with the remote computing device 104. As discussed in more detail below, user-side pairing logic may be configured to cause the user device 102 to provide a user interface on the user device 102 for registering the user and/or vehicle 106. In creating the profile, the user may submit the vehicle identifier and a unique service identifier.

In block 354, the remote computing device 104 creates the user profile. Creating the user profile may include creating an account for the user that links the vehicle identifier with the unique service identifier and the BLE identifier. Creating the profile may also include creating a user token that may be used for authentication (described in more detail below). The user token may include an encrypted security token, with the security key being stored at the vehicle computing device 206. In block 356, the remote computing device 104 can send the user token and the BLE identifier to the user device 102. The user computing device 202 may store this information for later use.

Figure 4:
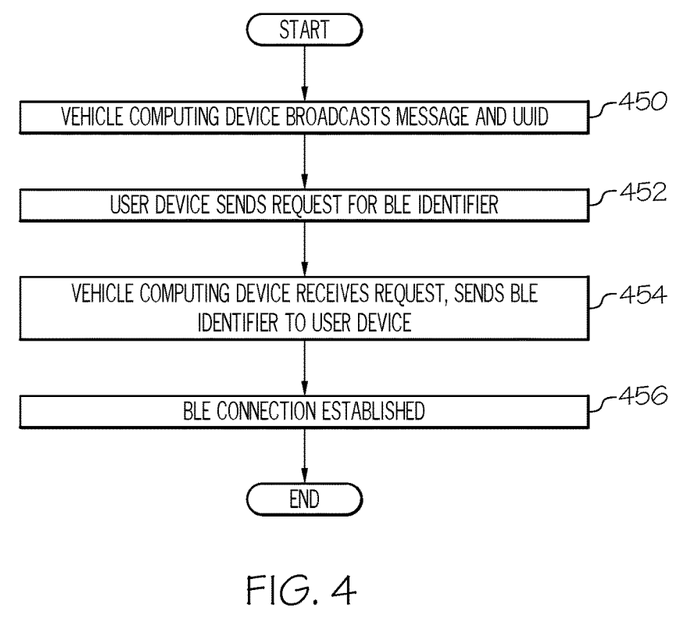
FIG. 4 depicts a flowchart for establishing a Bluetooth low energy connection between a user computing device and a vehicle computing device, according to embodiments described herein.

FIG. 4 depicts a flowchart for establishing a first communication protocol connection, such as a Bluetooth low energy connection between a user computing device 202 and a vehicle computing device 206, according to embodiments described herein. As illustrated in block 450, the vehicle computing device 206 broadcasts a vehicle unique message and/or the unique service identifier. This communication may be made according to Bluetooth standards, depending on the embodiment.

In block 452, the user device 102, which is scanning the BLE protocol, detects the message broadcast from the vehicle 106. In response to receiving the message, the user device 102 sends a scan request for the BLE identifier. In block 454, the vehicle computing device 206 receives the scan request and sends the BLE identifier to the user device 102. In block 456, in response to the user device 102 receiving the BLE identifier, a BLE connection between the user device 102 and the vehicle 106 may be established.

Figure 5:
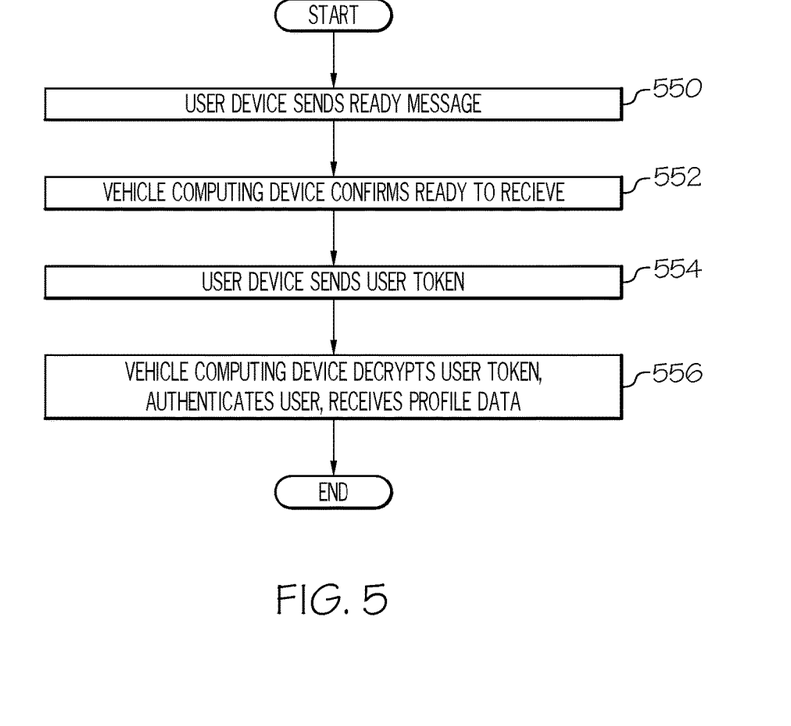
FIG. 5 depicts a flowchart for decrypting a user token in establishing a Bluetooth connection between a user computing device and a vehicle computing device, according to embodiments described herein.

FIG. 5 depicts a flowchart for decrypting a user token in establishing a Bluetooth connection between a user computing device 202 and a vehicle computing device 206, according to embodiments described herein. As illustrated in block 550, the user device 102 sends a ready to send profile message. In block 552, the vehicle computing device 206 may confirm that it is ready to receive the profile. In block 554, the user device 102 sends the user token to the vehicle 106. In block 556, the vehicle computing device 206 decrypts the user token, authenticates the user, and receives profile data regarding the user and/or user device 102. Depending on the particular embodiment, the profile data may be retrieved from the remote computing device 104 and/or the user device 102.

Figure 6:
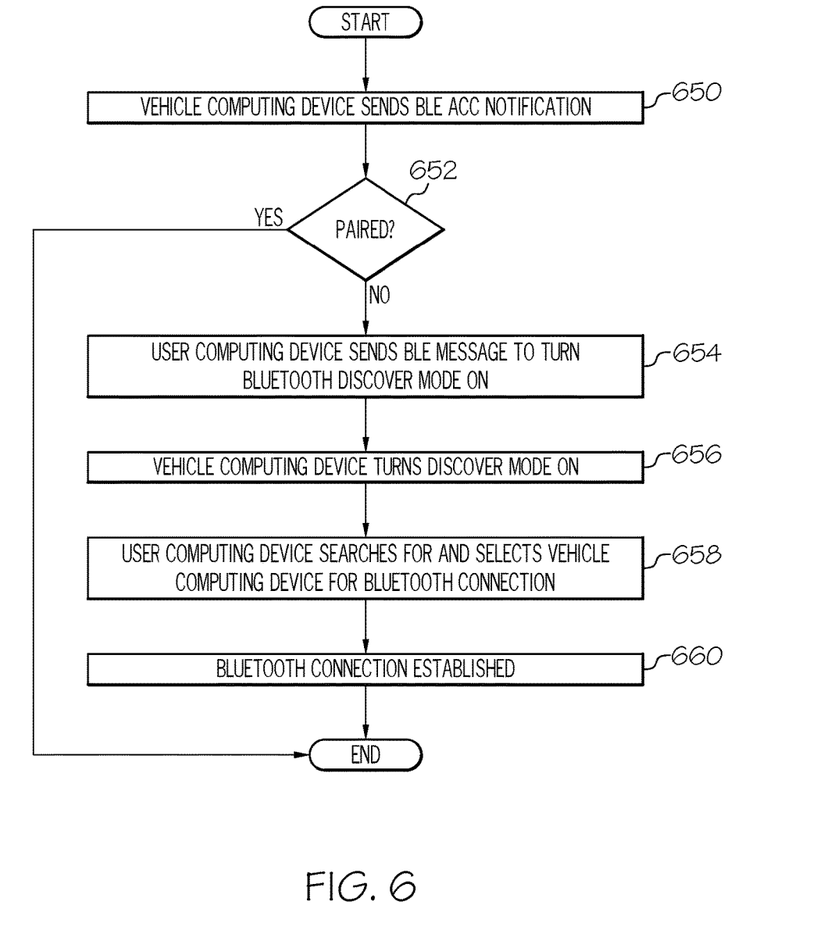
FIG. 6 depicts a flowchart for automatically pairing a user computing device with a vehicle computing device, according to embodiments described herein.

FIG. 6 depicts a flowchart for automatically pairing a user computing device 202 with a vehicle computing device 206, according to embodiments described herein. As illustrated in block 650, the vehicle computing device 206 may send a BLE acceptance notification to the user device 102 confirming that a BLE connection between the user device 102 and the vehicle computing device 206 has been established.

In block 652, a determination is made regarding whether the user device 102 and the vehicle computing device 206 are paired via a Bluetooth classic protocol. If the user device 102 is already paired with the vehicle 106, the process may end. If the user device 102 is not paired with the vehicle 106, at block 654, the user computing device 202 may send a BLE message instructing the vehicle computing device 206 to turn Bluetooth classic discover mode on, making itself discoverable. In some embodiments, prior to block 654, the vehicle computing device 206 may send a notification via the BLE protocol that the vehicle computing device 206 is ready to pair. In block 656, the vehicle computing device 206 turns discover mode on. In block 658, the user computing device 202 searches for and selects the vehicle computing device 206, thereby beginning the Bluetooth classic pairing process. In block 660, a Bluetooth classic connection is established between the user device 102 and the vehicle 106.

It should be understood that while embodiments described above may be utilized for pairing two devices, these are merely examples. Some embodiments may involve the remote computing device 104 for establishing the BLE protocol connection. As another example, profile information may be retrieved from the remote computing device 104 by the vehicle computing device 206. The BLE connection between the user device 102 and the vehicle 106 would only serve as a pointer to the profile information stored at the remote computing device 104.

Additionally, in some embodiments, the user token can be paired with basic profile information, so that communication with the remote computing device 104 is unnecessary to transfer the most vital profile information. For example, the profile information could be a string of data that transfers the user's name, which could then be displayed on a vehicle user interface when powered on (i.e. "Hello John"). Any information that is best retrieved before accessory power is targeted.

Figure 7:
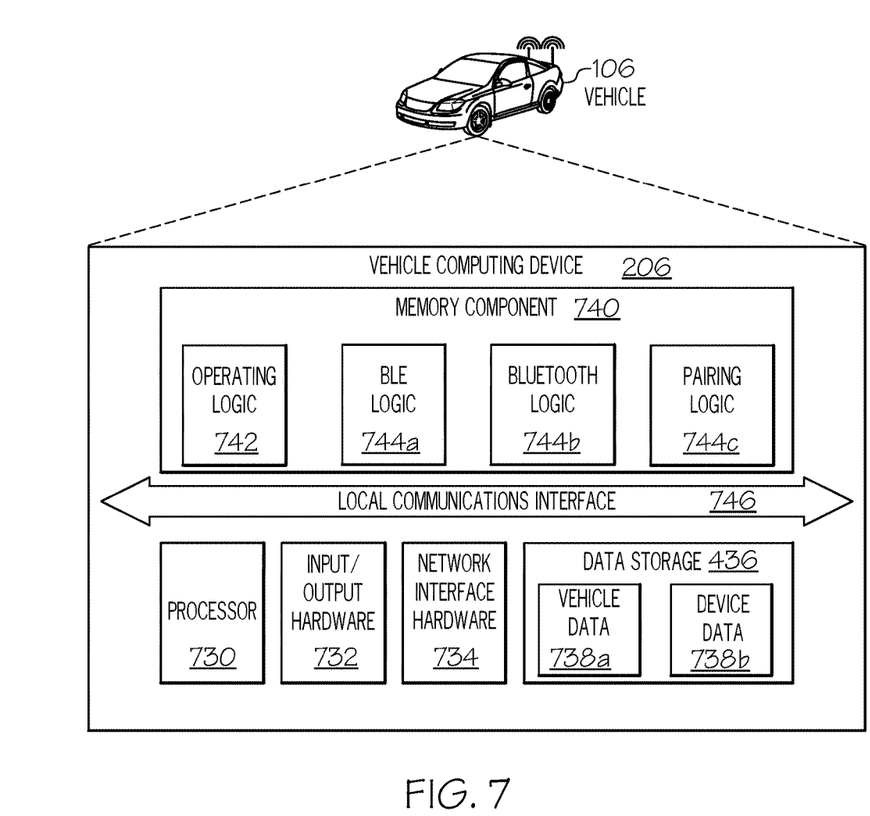
FIG. 7 depicts details of a vehicle computing device for auto-pairing via a plurality of protocols, according to embodiments described herein.

FIG. 7 depicts details of a vehicle computing device 206 for auto-pairing via a plurality of protocols, according to embodiments described herein. The vehicle computing device 206 includes a processor 730, input/output hardware 732, the network interface hardware 734, a data storage component 736 (which stores vehicle data 738a, device data 738b, and/or other data), and the memory component 740. The memory component 740 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 206 and/or external to the vehicle computing device 206.

The memory component 740 may store operating logic 742, the BLE logic 744a, the Bluetooth logic 744b, and the pairing logic 744c. The BLE logic 744a, the Bluetooth logic 744b, and the pairing logic 744c may each include a plurality of different pieces of logic, each of which may be embodied as a computer program, firmware, and/or hardware, as an example. A local communications interface 746 is also included in FIG. 7 and may be implemented as a bus or other communication interface to facilitate communication among the components of the vehicle computing device 206.

The processor 730 may include any processing component operable to receive and execute instructions (such as from a data storage component 736 and/or the memory component 740). As described above, the input/output hardware 732 may include and/or be configured to interface with the components of the vehicle computing device 206.

The network interface hardware 734 may include and/or be configured for communicating with any wired or wireless networking hardware, including an antenna, a modem, LAN port, wireless fidelity (Wi-Fi) card, WiMax card, Bluetooth chip, USB card, mobile communications hardware, Bluetooth chip, BLE chip, and/or other hardware for communicating with other networks and/or devices. From this connection, communication may be facilitated between the vehicle computing device 206 and other computing devices, such as via the internet, to provide the functionality described herein.

The operating logic 742 may include an operating system and/or other software for managing components of the vehicle computing device 206. As also discussed above, the BLE logic 744a may reside in the memory component 740 and may be configured to cause the processor 730 facilitate connecting a user device 102 with the vehicle computing device 206 via a BLE protocol. Similarly, the Bluetooth logic 744b may be utilized to connect the user device 102 with the vehicle computing device 206 via a Bluetooth classic protocol, as described above. The pairing logic 744c may be configured to cause the vehicle computing device 206 facilitate the pairing process, as described above.

It should be understood that while the components in FIG. 7 are illustrated as residing within the vehicle computing device 206, this is merely an example. In some embodiments, one or more of the components may reside external to the vehicle computing device 206. It should also be understood that, while the vehicle computing device 206 is illustrated as a single device, this is also merely an example. In some embodiments, the BLE logic 744a, the Bluetooth logic 744b, and the pairing logic 744c may reside on different computing devices. As an example, one or more of the functionality and/or components described herein may be provided by another computing device, such as the user device 102, the remote computing device 104, etc.

Additionally, while the vehicle computing device 206 is illustrated with the BLE logic 744a, the Bluetooth logic 744b, and the pairing logic 744c as separate logical components, this is also an example. In some embodiments, a single piece of logic may cause the vehicle computing device 206 to provide the described functionality. Additionally, the remote computing device 104 and/or the vehicle computing device 206 may include similar hardware and software.

It should also be understood that while some embodiments may utilize a BLE protocol as a first protocol and a Bluetooth classic protocol as a second protocol, these are merely examples. Some embodiments may utilize other wired or wireless protocols for auto-pairing a plurality of devices.

As illustrated above, various embodiments auto-pairing via a plurality of protocols are disclosed. These embodiments provide a mechanism for a user to automatically pair two devices via a wireless protocol without having to complete a traditional pairing process. These embodiments may additionally be configured such that the vehicle computing device only connects to a registered user of the vehicle (random users with BLE should not be able to establish a connection), thus making the connection secure. Similarly, embodiments may be configured such that the vehicle computing device is able to identify the user and receive some basic user profile information before they enter the vehicle and turn accessory power on. Embodiments may be configured to operate without utilizing an internet connection to complete the task of BLE connection (once user device has the necessary data).

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for auto-pairing via a plurality of protocols. It should also be understood that these embodiments are merely exemplary and are not intended to limit the scope of this disclosure.

What is claimed is:

1. A system for auto-pairing via a plurality of protocols comprising:
    an environment computing device that includes an environment-side Bluetooth low energy (BLE) hardware component for facilitating communication via a BLE protocol, an environment-side Bluetooth classic hardware component for facilitating communication via a Bluetooth classic protocol, and a memory component that stores logic that, when executed by the environment computing device, causes the environment computing device to perform at least the following:
        establish, via the BLE hardware component, a BLE connection with a user device;
        receive a message via the BLE connection to turn on a Bluetooth classic discover mode; and
        establish a Bluetooth classic connection with the user device.

2. The system of claim 1, further comprising the user device, wherein the user device includes a user-side BLE hardware component and a user-side Bluetooth classic hardware component.

3. The system of claim 1, further comprising a remote computing device, wherein a user registers a profile with the remote computing device.

4. The system of claim 1, wherein the environment computing device receives a user token from the user device and, upon receiving the user token from the user device, the environment computing device decrypts the user token, authenticates a user, and receives profile data associated with the user.

5. The system of claim 1, wherein establishing the BLE connection includes:
    the environment computing device broadcasting a message and a unique service identifier;
    the user device detecting the message and sending a request for an identifier associated with a user-side BLE hardware component; and
    the environment computing device receiving the request and sending the identifier associated with the user-side BLE hardware component to the user device.

6. The system of claim 1, wherein the environment computing device serves an environment that includes at least one of the following: a land-based vehicle, an air-based vehicle, a water-based vehicle, a home, or an office.

7. The system of claim 1, wherein the environment computing device further comprises a modem for communicating with a remote computing device.

8. A system for auto-pairing via a plurality of protocols comprising:
- a user device that includes a first communication hardware component for communicating via a first communication protocol, a second communication hardware component for communicating via a second communication protocol, a first processor, and a first memory component that stores user-side logic;
- an environment computing device that includes a third communication hardware component for communicating via the first communication protocol, a fourth communication hardware component for communicating via the second communication protocol, a second processor, and a second memory component that stores environment-side logic, wherein:
- the environment-side logic causes the environment computing device to send an identifier associated with the third communication hardware component to the user device and establishes a connection with the user device via the first communication protocol;
- the user-side logic causes the user device to communicate a message to the environment computing device via the first communication protocol to turn on a discover mode on the fourth communication hardware component;
- the environment-side logic causes the environment computing device to turn on a discover mode for the second communication protocol and pair with the user device via the second communication protocol.

9. The system of claim 8, wherein the environment computing device serves an environment that includes at least one of the following: a land-based vehicle, an air-based vehicle, a water-based vehicle, a home, or an office.

10. The system of claim 8, wherein the first communication protocol includes a BLE protocol.

11. The system of claim 8, wherein the second communication protocol includes a Bluetooth classic protocol.

12. The system of claim 8, wherein the environment computing device receives a user token from the user device and, upon receiving the user token from the user device, the environment computing device decrypts the user token, authenticates a user, and receives profile data associated with the user.

13. The system of claim 8, further comprising a remote computing device, wherein a user registers a profile with the remote computing device via a third communication protocol.

14. The system of claim 8, wherein establishing the connection via the first communication protocol includes: the environment computing device broadcasting a message and a unique service identifier;
- the user device detecting the message and sending a request for the identifier associated with the third communication hardware component; and
- the environment computing device receiving the request and sending the identifier associated with the third communication hardware component to the user device.

15. A vehicle comprising:
a vehicle computing device that includes a Bluetooth low energy (BLE) hardware component for facilitating communication via a BLE protocol, a Bluetooth classic hardware component for facilitating communication via a Bluetooth classic protocol, and a memory component that stores logic that, when executed by the vehicle computing device, causes the vehicle computing device to perform at least the following:
- establish, via the BLE hardware component, a BLE connection with a user device;
- receive a message via the BLE connection to turn on a Bluetooth classic discover mode;
- in response to receiving the message to turn on the Bluetooth classic discover mode, turn on the Bluetooth classic discover mode via the Bluetooth classic hardware component; and
- establish a Bluetooth classic connection with the user device.

16. The vehicle of claim 15, wherein the logic further causes the vehicle computing device to perform at least the following:
- receive a request for a BLE identifier from the user device, the BLE identifier being associated with the BLE hardware component; and
- send the BLE identifier to the user device to establish the BLE connection with the user device.

17. The vehicle of claim 16, wherein the logic further causes the vehicle computing device to register the vehicle with a remote computing device, wherein registration includes submitting a vehicle identifier and the BLE identifier.

18. The vehicle of claim 15, wherein the logic further causes the vehicle computing device to perform at least the following:
- receive the user token from the user device; and
- decrypt the user token, authenticate a user, and receive profile data associated with the user.

19. The vehicle of claim 15, wherein the user device registers a user with a remote computing device, and wherein registering the user comprises creating a user profile that is associated with a vehicle identifier and a user token for authenticating the user with the vehicle.

20. The vehicle of claim 15, wherein the vehicle computing device further comprises a modem for communicating with a remote computing device.

* * * * *